United States Patent [19]

Marquis et al.

[11] Patent Number: 5,183,514

[45] Date of Patent: Feb. 2, 1993

[54] PROCESS FOR DISSOLVING OR REMOVING RIGID POLYURETHANE FOAM BY CONTACTING WITH 1,2-DIMETHYL IMIDAZOLE

[75] Inventors: Edward T. Marquis; George P. Speranza; Wei-Yang Su, all of Austin, Tex.

[73] Assignee: Texaco Chemical Company, White Plains, N.Y.

[21] Appl. No.: 677,927

[22] Filed: Apr. 1, 1991

[51] Int. Cl.$^5$ .................. C11D 1/50; C11D 7/32; C11D 7/50; C23G 5/02

[52] U.S. Cl. ..................................... 134/38; 134/40; 252/153; 252/170; 521/918

[58] Field of Search ............... 134/38, 40, 42, 22.13, 134/22.17; 252/170, 153, 174.14; 521/918

[56] References Cited

U.S. PATENT DOCUMENTS

| | | | |
|---|---|---|---|
| Re. 27,432 | 7/1972 | Torrenzano et al. | 8/621 |
| 4,009,048 | 2/1977 | Jensen et al. | 134/12 |
| 4,028,299 | 6/1977 | Olstowski | 524/729 |
| 4,120,810 | 10/1978 | Palmer | 252/169 |
| 4,309,300 | 6/1982 | Danforth et al. | 134/38 X |
| 4,514,530 | 4/1985 | Sellstrom et al. | 523/456 |
| 4,704,234 | 11/1987 | Peterson et al. | 134/40 X |

FOREIGN PATENT DOCUMENTS 1093884 12/1967 United Kingdom.

OTHER PUBLICATIONS

H. L. Jackson and R. J. Gallagher, Jr., "DBE Purges Polyurethane Equipment without Methylene Chloride Risks", *Elastomerics*, Oct. 1990, pp. 56–60.

A. Luttringhaus and H. W. Dirksen, "Tetramethylurea as a Solvent and Reagent", Angew. Chem. Internat. Edit., vol. 3, (1964), No. 4, pp. 260–269.

*Primary Examiner*—Theodore Morris
*Assistant Examiner*—Saeed T. Chaudhry
*Attorney, Agent, or Firm*—Jack H. Park; Kenneth R. Priem; Russell R. Stolle

[57] ABSTRACT

A process for the dissolution of polyurethane foams is disclosed. A polyurethane foam may be dissolved, or removed from a substrate, by contacting the polyurethane foam with 1,2-dialkyl imidazole, alone or as a co-solvent.

10 Claims, No Drawings

PROCESS FOR DISSOLVING OR REMOVING RIGID POLYURETHANE FOAM BY CONTACTING WITH 1,2-DIMETHYL IMIDAZOLE

CROSS-REFERENCE TO RELATED APPLICATIONS

This application is related to the following co-pending U.S. patent applications: Ser. No. 07/629,513, filed Dec. 18, 1990; and Ser. No. 07/626,818, filed Dec. 13, 1990.

BACKGROUND OF THE INVENTION

1. Field of the Invention

The invention relates to solvents for dissolving cured and/or uncured polyurethane foams.

2. Description of Related Methods

A variety of solvents have been used to clean polyurethane foam from processing equipment, metal parts and tools, both before and after the polyurethane foam has cured on them. Some of the solvents used include such compounds as dimethyl formamide, 1,1,1-trichloroethane, methylene chloride, chlorofluorocarbons, toluene, xylene, acetone, methyl ethyl ketone, ethylene glycol ethers, tetrahydrofuran, and γ-butyrolactone. However, though these compounds are effective solvents, the use of each presents a hazard or complication of one type or another. For example, the chlorine-containing compounds are now thought to contribute to ozone depletion in the atmosphere. The other solvents are either toxic, suspected carcinogens, or very volatile, and thus present health and safety problems.

Applicants have discovered, surprisingly, that polyurethane foam may be dissolved, or removed from a substrate, by contacting the polyurethane foam with a solvent comprising 1,2-dialkyl imidazole. The present inventive process, by substituting in whole or in part 1,2-dialkyl imidazole for the more hazardous prior art solvents, reduces many of the health, safety and environmental hazards associated with the prior art solvents.

SUMMARY OF THE INVENTION

The invention concerns a process for dissolving polyurethane foam, comprising contacting polyurethane foam with 1,2-dialkyl imidazole. In another of its aspects, the invention concerns a process for removing polyurethane foam from a substrate, comprising contacting said polyurethane foam with a solvent formulation containing 1,2-dialkyl imidazole. The invention further concerns, in a process for removing polyurethane foam from a substrate by contacting said polyurethane foam with a solvent in which said polyurethane foam is at least partially soluble, the improvement comprising substituting 1,2-dialkyl imidazole for a portion of said solvent.

DESCRIPTION OF THE PREFERRED EMBODIMENTS 1,2-Dialkyl imidazoles useful in the present invention may be represented by the following formula:

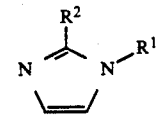

where $R^1$ and $R^2$ are each an alkyl group. It is preferred that $R^1$ and $R^2$ each represent an alkyl group having no more than 20 carbon atoms. It is especially preferred (1) that both $R^1$ and $R^2$ be a methyl group, i.e. that the 1,2-dialkyl imidazole be 1,2-dimethyl imidazole, or (2) that $R^1$ be an isopropyl group and $R^2$ be a methyl group, i.e. that the 1,2-dialkyl imidazole be 1-isopropyl-2-methyl imidazole. Alternatively, a mixture of 1,2-dialkyl imidazoles may be used. Some 1,2-dialkyl imidazoles are commercially available. Additionally, 1,2-dialkyl imidazoles may be prepared by the methods claimed in U.S. Pat. Nos. 4,921,969 and 4,927,942, incorporated herein by reference.

The solvents for which 1,2-dialkyl imidazoles may be substituted, in whole or in part, include, but are not limited to, solvents selected from the group consisting of aromatic hydrocarbons, alcohols, ketones, esters, ethers, glycol ethers, alkylene carbonates and ureas. Examples of suitable co-solvents include one or more of the following: toluene, 2-ethyl-1-hexanol, ethylene glycol diacetate, 2-ethylhexyl acetate, N-methyl pyrrolidinone, tetrahydrofurfuryl alcohol, ethylene glycol butyl ether acetate, tetramethyl urea, diethylene glycol butyl ether, ethylene glycol butyl ether, methyl iso-amyl ketone, diethylene glycol methyl ether, dipropylene glycol methyl ether, dibasic ester, methyl isobutyl ketone, N,N'-dimethyl ethylene urea, propylene glycol methyl ether, cyclohexanone, diacetone alcohol, furfuryl alcohol, and isobutyl isobutyrate. Of course, the solvents for which 1,2-dialkyl imidazoles may be substituted, in whole or in part, include the more hazardous solvents described in the first paragraph of the Description of Related Methods. Optionally, other solvents may be added to the formulations of the present invention as well.

Preferably, the portion of conventional solvent replaced with 1,2-dialkyl imidazole in a formulation containing one or more conventional (non-1,2-dialkyl imidazole) solvents will be such that the 1,2-dialkyl imidazole and the conventional solvents in the formulation are present in a weight ratio of 1,2-dialkyl imidazole to total conventional solvent of about 4:1 to about 1:4. It is more preferred that the 1,2-dialkyl imidazole and the conventional solvents in the formulation be present in a weight ratio of 1,2-dialkyl imidazole to total conventional solvent of about 1:2 to about 1:3. One skilled in the art may find other weight ratios to be optimum and not depart from the scope of the present invention. Those skilled in the art will appreciate that the portion of conventional solvent(s) in a formulation which should be replaced with 1,2-dialkyl imidazole for a given polyurethane foam involves a balance of possible reduction in dissolution power versus the reduction or avoidance of additional expense and/or environmental, health and safety risks associated with the conventional solvents. Applicant has demonstrated the use of several different formulations in the examples that follow.

Optionally, other additives may be employed in the formulations of the present invention. For example, suitable thickeners may be included, such as ethylcellulose, hydroxypropyl cellulose, organic modified clay, hydrogenated castor oil, and the like. Surfactants, to enhance the water washability of the substrate, may be included as well. Suitable surfactants include potassium oleate, the dioctyl ester of sodium sulfosuccinic acid, sodium alkylnaphthalene sulfonate, sodium alkylbenzene sulfonate, and the like.

Applicants' inventive process is effective at temperatures of from about room temperature to about 100° C. and at pressures of from about atmospheric to several hundred psi. Optionally, the process of the present invention may be performed at an elevated temperature. While Applicants' invention works well at room temperature, more rapid dissolution may be obtained by heating the 1,2-dialkyl imidazole-containing formulation to a temperature of about 50 to about 100° C. The 1,2-dialkyl imidazole-containing formulation may be applied to the polyurethane foam in any conventional manner. Typically, the polyurethane foam-coated substrate will be placed in a vat or sonic bath containing the 1,2-dialkyl imidazole-containing formulation. Alternatively, the 1,2-dialkyl imidazole-containing formulation could be applied to the foam-coated substrate by brush or spray. The period of time for which the 1,2-dialkyl imidazole-containing formulation should be permitted to work undisturbed on the polyurethane foam to be removed will vary. After said period of time, agitation of the surfaces to be cleaned of the foam via wiping, brushing or scraping is preferred.

Rigid polyurethane foam formulations are well known in the art and are commercially available. Rigid foams are more highly cross-linked than either elastomers or flexible foams. Other characteristics generally true of rigid polyurethane foams include (1) a structure having a high percentage of closed cells; (2) low thermal conductivity; (3) nonreversible deformability; (4) good load-bearing ability; and (5) high dimensional stability. Generally, rigid polyurethane foams are based on polyols having a molecular weight less than 1000, and more often from about 400 to about 800. Rigid polyurethane foams are usually based on a polyol having a functionality of 2 to 8, and more typically from about 4 to about 8.

Flexible polyurethane foam formulations also are well known in the art and are commercially available. In contrast to rigid foams, flexible foams are not highly cross-linked. Other characteristics generally true of flexible polyurethane foams include (1) a structure having a high percentage of open cells; (2) air permeability; (3) reversible deformability; (4) a limited resistance to an applied load; and (5) low dimensional stability. Generally, flexible polyurethane foams are based on polyols having a molecular weight greater than 1000 (about 70 atoms or more per chain). Flexible polyurethane foams usually are based on a polyol having a functionality of about 2 to 4, and more typically of about 2 to 3. The invention will be further illustrated by the following examples, which are given by way of illustration and not as limitations on the scope of this invention.

EXAMPLES

In the examples recorded in the table below, the following procedure was used. Previously coated stainless steel ¾ screw stock rods were wire brushed and cleaned with a solvent. Rods that had been coated with cured fiberglass were treated with acetone to remove any fiberglass residue; those that had been coated with cured flexible or rigid polyurethane foam were treated with methylene chloride. The rods were then sand blasted with micro beads. The rods were then coated with a rigid or flexible polyether-based foam formulation having the following components:

| Component | Parts by Weight |
|---|---|
| Rigid Foam | |
| Thanol ® R-350-X | 36.9 |
| DC-193[1] (silicon surfactant) | 0.5 |
| R11 (trichlorofluoromethane) | 15.0 |
| TEXACAT ® TD-33 | 0.3 |
| Rubinate M[2] (polymeric isocyanate) | 49.6 |
| [1]Dow Corning; [2]ICI. | |
| Flexible Foam | |
| Thanol ® SF-5505[1] | 60.0 |
| Niax 34-28 Polymer Polyol[2] | 40.0 |
| Deionized Water | 3.5 |
| Diethanolamine | 1.5 |
| Silicon Oil L-5309[3] | 1.5 |
| TEXACAT ®-33A[4] (33% TEDA in DPG) | 0.5 |
| UL-1 (organotin in cmp.)[5] | 0.0065 |
| Toluene diisocyanate | 44.5 |

[1]Arco; [2]Union Carbide; [3]Union Carbide; [4]Texaco Chemical Co.; [5]Witco Fomrez ®

The foams were then allowed to cure for two days or more before dissolution studies were begun. Each coated stock rod was then suspended in a beaker from a ring stand. Each beaker contained one of the solvent formulations recorded in the table below. At the bottom of each beaker was a stirring bar. After from about 16 to about 22 hours at room temperature the rods were observed and the approximate percentage of polyurethane foam removed by each formulation was estimated and recorded.

| Ex. No. | Foam Type | Solvent System Components | Weight Ratio of Components | Approximate % Foam Removed |
|---|---|---|---|---|
| 1 | Cured Flexible | 1-isopropyl-2-methyl imidazole | All | 100% |
| 2 | Cured Flexible | N,N-dimethyl-formamide | All | 100% |
| 3 | Cured Rigid | 1,2-dimethyl imidazole | All | 100% |
| 4 | Cured Rigid | N,N-dimethyl-formamide | All | 100% |
| 5 | Cured Rigid | PC/1,2-dimethyl imidazole | 70/110 | 60% |
| 6 | Cured Rigid | PC/1,2-dimethyl imidazole | 90/90 | 50% |

PC = Propylene carbonate.

We claim:

1. A process for dissolve rigid polyurethane foam, comprising the step of contacting rigid polyurethane foam with 1,2-dimethyl imidazole for a period of time sufficient to dissolve substantially all of the rigid polyurethane foam.

2. The process of claim 1, in which the polyurethane foam is a cured rigid polyether-based polyurethane foam.

3. The process of claim 1, in which the polyurethane foam is a cured, flexible polyether-based polyurethane foam.

4. A process for remove rigid polyurethane foam from a substrate, comprising the step of contacting said rigid polyurethane foam with a solvent formulation containing 1,2-dimethyl imidazole for a period of time sufficient to removes substantially all of the rigid polyurethane foam from said substrate.

5. The process of claim 4, in which the cured polyurethane foam is a cured rigid polyether-based polyurethane foam.

6. The process of claim 4, in which the solvent formulation contains 1,2-dimethyl imidazole and a second solvent in which said rigid polyurethane foam is at least partially soluble.

7. The process of claim 6, in which the solvent formulation contains 1,2-dimethyl imidazole and a second solvent selected from the group consisting of aromatic hydrocarbons, alcohols, ketones, esters, ethers, glycol ethers, alkylene carbonates, and ureas.

8. The process of claim 6, in which the solvent formulation contains 1,2-dimethyl imidazole and a second solvent selected from the group consisting of toluene, 2-ethyl-1-hexanol, ethylene glycol diacetate, 2-ethylhexyl acetate, N-methyl pyrrolidinone, tetrahydrofurfuryl alcohol, ethylene glycol butyl ether acetate, tetramethyl urea, diethylene glycol butyl ether, ethylene glycol butyl ether, methyl iso-amyl ketone, diethylene glycol methyl ether, dipropylene glycol methyl ether, dibasic ester, methyl isobutyl ketone, N,N'-dimethyl ethylene urea, propylene glycol methyl ether, cyclohexanone, diacetone alcohol, furfuryl alcohol, and isobutyl isobutyrate.

9. In a process for removing rigid polyurethane foam from a substrate by contacting said rigid polyurethane foam with a solvent in which said rigid polyurethane foam is at least partially soluble, the improvement comprising substituting 1,2-dimethyl imidazole for a portion of said solvent and contacting said foam with said solvent and 1,2-dimethyl imidazole for a period of time sufficient to remove substantially all of the rigid polyurethane foam from said substrate.

10. The process of claim 9, in which the polyurethane foam is a cured rigid polyether-based polyurethane foam.

* * * * *